Dec. 1, 1942.    F. J. GELINAS    2,303,629
POROUS ARTICLES OF BONDED GRANULAR MATERIAL
Filed Dec. 30, 1940

INVENTOR.
Frank J. Gelinas
BY W Russell Greenwood
ATTORNEY

Patented Dec. 1, 1942

2,303,629

UNITED STATES PATENT OFFICE 2,303,629

POROUS ARTICLE OF BONDED GRANULAR MATERIAL

Frank J. Gelinas, Woonsocket, R. I.

Application December 30, 1940, Serial No. 372,324

1 Claim. (Cl. 210—205)

This invention relates to light-weight porous articles, and in particular to rigid, porous bodies composed of granular material firmly bound together into an integral structural unit by cementitious material and capable of being cast or molded into such products from a plastic or a wet mix of the materials; and has for one of its objects the production of molded porous products such as, for example, porous pipe and various molded porous articles in slab form, which are permeable to the passage of fluids and are adapted for use as filters, for drainage purposes and the like.

Another object of the invention is to provide a novel and superior composition which is highly useful for making molded or cast porous articles, such as, for example, castable pipe and slab-like bodies possessing lighter weight than other forms of molded products now on the market for drainage purposes and for filtering purposes, and of which I am aware.

Another object of the invention is to provide a rigid, fully porous, acid-proof article which will possess a relatively high degree of uniformity in structure and a controllable permeability.

Another object of the invention is to provide cast porous products of various degrees of permeability, as desired, and in particular to make a porous pipe or a slab-like porous medium which has a relatively uniform permeable structure throughout its extent of either fast or slow drainage or filtering qualities as desired, high strength and capable of being easily manufactured at low cost.

Another object of the invention is the manufacture of pipe of relatively uniform permeability utilizing a porous granular material as the aggregate therein consisting of coke in fine and coarse sizes bonded into an integral porous structure by a cementing agent.

With these and other objects in view, as will be apparent from the following disclosure, the invention resides in the composition of matter and the constructions herein described and as set forth in the specification and covered by the claim appended hereto.

Rigid porous articles which are permeable to the passage of liquids and gases, and which are adapted for use as filtering and diffusion mediums in various chemical and industrial processes and for filtering purposes in general, are known, but these prior porous articles are expensive and they have comprised mineral granules of a refractory material, such as a crystalline alumina or silicon carbide united into a rigid integral porous structure by a vitrified ceramic binder, such as a mixture of ball clay, slip clay and feldspar proportioned and treated as is well known in the ceramic art during which treatment the bond is subjected to a heat treatment at elevated temperatures to vitrify the bond.

It is desirable, however, to provide a rigid porous article of a fully permeable structure of simple and inexpensive construction comprising granular material bound together by a settable cementitious material into an integral porous mass and to utilize waste material as the aggregate and in a degree of sub-division according to the particular permeability and strength desired and use for which the article is intended.

One aspect of the invention contemplates the manufacture of rigid porous articles of a permeable structure for use for various drainage and filtering purposes, and in this connection it is particularly directed to the making of a light-weight porous pipe and of various porous slab-like articles which have relatively uniform and controlled permeability and are especially adapted for use in various sub-surface drainage systems to replace the usual forms of drain pipe commonly used in such systems.

It is therefore the aims of the present invention to provide rigid molded porous articles of the above character having the desirable qualities of controlled and uniform permeability, great lightness, high strength and low cost of manufacture by the novel structure of such articles and the composition of which they are made.

In its preferred form, the present invention contemplates the production of a rigid, light-weight, cast or molded porous body which is fully permeable throughout its whole physical structure, and it has been found that by controlling the size and shape of the individual particles of a porous material, specifically coke, making up the aggregate as well as by the proportion of fine and coarse particles utilized as the aggregate and by the use of definite proportions of a cementing agent, a fully permeable porous medium may be produced possessing a relatively uniform porous structure and in which the permeability is relatively uniform and capable of passing fluids efficiently over a wide range from rapid to slow rates of flow, as desired.

Figure 1:
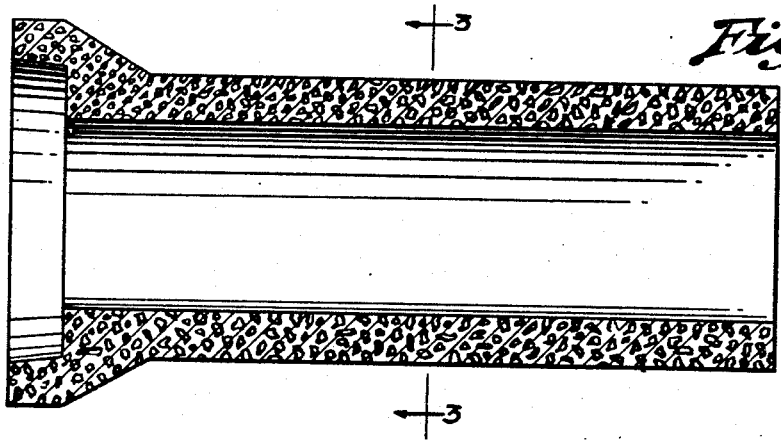
Fig. 1 is a central longitudinal view, on reduced scale, of a drainage pipe of the bell end type embodying the present invention.
Figure 2:
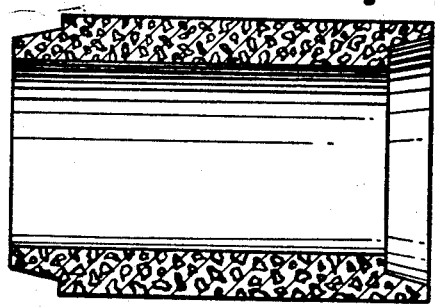
Fig. 2 is a central longitudinal view, also on reduced scale, of a drainage pipe of the tongue and groove style embodying the invention.
Figure 3:
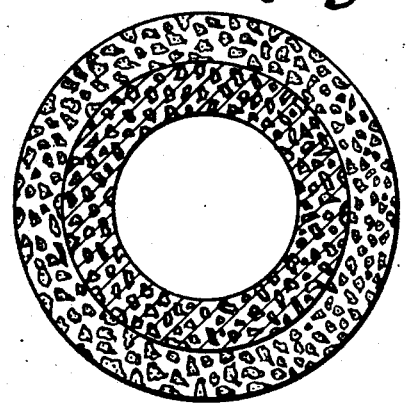
Fig. 3 is a transverse sectional view taken approximately on the line 3—3 of Fig. 1.
Figure 4:
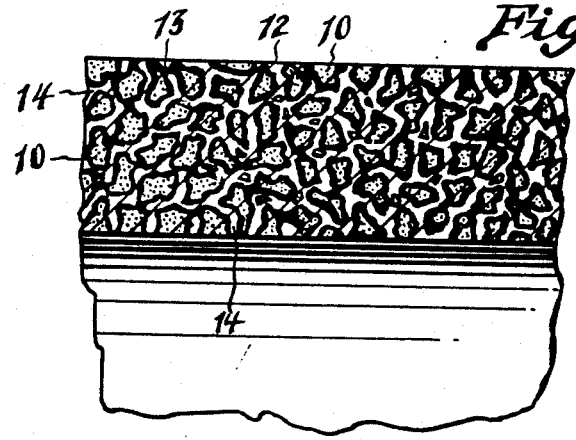
Fig. 4 is a fragmentary detail sectional view, on enlarged scale of the wall structure of either of the embodiments shown in Figs. 1 and 2 showing the fully permeable character of the walls.
Figure 5:
Fig. 5 is a perspective view, on reduced scale, of a slab-like article for filtering purposes constructed in accordance with the present invention.

In carrying out my invention I prefer to use as an aggregate, crushed coke in the form of a mixture of relatively coarse lumps and finer size particles, bonded into a rigid integral porous fully permeable structure by a suitable settable cementitious binder, such as, for example, Portland cement and the like. To these ends, I employ granular coke material of a desired size or sizes bonded into a porous structure by the Portland cement and the like, set and cured in the presence of the granular aggregate, the bond adhering locally to the aggregate and forming connecting posts and webs therebetween and intergranular spaces or voids of various sizes which intercommunicate to form passages through the bonded structure of the porous medium to permit the flow of fluid therethrough. Three embodiments of my invention are shown in Figs. 1, 2 and 5 of the accompanying drawing, in which there is shown in Figs. 1 and 2 central longitudinal sections of two forms of pipe having a fully porous permeable structure while Fig. 5 illustrates a slab provided with this permeable structure. As illustrated in Fig. 4, in which there is represented on enlarged scale the porous permeable structure of the embodiments shown in Figs. 1, 2 and 5, the individual coke bodies 10 have their surfaces coated with the cement layer 12 which may contain coke dust to provide fine filaments entering the surface pores of the coated coke granules and also forming the posts or webs 13 between adjacent coke bodies to connect them together and leave the intergranular voids 14 which form fluid passages through the medium.

As a specific and illustrative example of a composition suitable for my purposes, I may use a coke-cement mixture consisting of three parts of coke aggregate and one part of Portland cement, the above proportions being by volume of the entire mixture. These materials are mixed with water to form a castable or moldable mass which is shaped as desired, and then dried, set and cured with the proper amount of moisture to solidify the bond and unite the aggregate into an integral porous mass. The coke aggregate used may be of any desired size or it may consist of a mixture of fine and coarse size coke bodies and to include that obtained in the form known as "breeze," which is preferably used in conjunction with larger lumps, such as, for example, those of pea size. The strength of the molded porous mediums, such as pipe, made of this composition by the use of both "breeze" and "pea size" coke aggregate will be much greater than by the use of either the fine sizes or the coarse size alone with the cement binder. The ratio of coke to cement may be varied widely depending upon whether it is desired to produce a rigid porous medium that will permit a lot of fluid to pass through it fast or one which will allow only a little fluid to go through slowly. In other words, the permeability of the pipe is in direct proportion to the final physical structure of the porous walls of the pipe or the body of other rigid porous media made of my composition, as well as being controlled also by the size and porosity of the coke aggregate used, and the amount of bond employed which should be sufficient to completely cover all the aggregate.

If desired, suitable reinforcing steel may be incorporated in the molded products, and in the manufacture of pipe a steel helix or steel reinforcing rods may be placed therein in order to give additional strength to the pipe.

In the preferred practice, the cement binder and the coke aggregate, made up of "coke breeze" and larger lumps of coke of miscellaneous graded sizes are first thoroughly mixed together in a dry state so that the cement will completely and uniformly coat the surface of each of the coke bodies or particles, or as nearly so as may be practical, prior to the addition of water to the mixture. After this mixing has been thoroughly caused to take place in the manner just described, water is then added gradually to the mix while constantly stirring the mixture, and sufficient water is added until the mass attains the consistency of mortar or acquires such a consistency that it can be readily cast into a mold and allowed to harden, or it can dry sufficiently to be removed from the mold after being cast and allowed to harden. It can also be poured in either a stationary or in an agitating type of mold as ordinary concrete and allowed to set either in a steam heated curing vault or permitted to dry, set and be cured with the proper amount of moisture under ordinary atmospheric conditions as practiced in the treatment of regular cement mixtures.

It is further found that by causing the mixture to take place in this manner by first stirring the ingredients to provide a uniform mixture while the particles are dry, the cement-coated coke upon being wetted with the water seems to draw the cement and fine coke dust into the surface pores of the larger coke pieces which become filled with the fluid mass of cement and coke to form fine hair-like filaments therein which become tenaciously anchored to the coke lumps and act to materially bond the adjacent coke bodies together into a rigid integral mass when dried, set and cured with the proper amount of moisture.

When the molded porous articles, thus described, and composed of the coke and cement material, are put under tensile strain it is found that instead of breaking by snapping off abruptly as would the usual more brittle concrete composition composed of Portland cement and sand, the material of my invention pulls apart gradually and seems to have some degree of elasticity in that it stretches just before it breaks rather than snapping off quickly.

The foregoing description is directed solely towards the constructions illustrated, but I desire it to be understood that I reserve all rights to such other forms and modifications that may be resorted to and falling in the spirit and scope of the invention as hereinafter defined by the appended claim.

Having thus described my invention, what I claim as new and desire to secure by Letters Patent is:

A filtering medium consisting of a molded unburned, porous body composed principally of coke in the form of pea-size lumps which are interspersed with assorted coke bodies of smaller size including coke dust, and a lessor quantity of Portland cement uniting said coke aggregate into a rigid integral structure, said cement binder being present only in an amount to completely coat said pea-sized coke lumps but not to entirely fill the intergranular voids between adjacent lumps of pea-size coke when said cement binder has shrunk down, set and hardened upon such lumps thereby providing intercommunicating fluid passages through the body whereby it will be completely permeable to fluids from one side of the body to the other side thereof, said cement coating containing coke dust and forming non-porous fine hairlike filaments which enter into the exterior pores of the coated coke lumps and are firmly anchored to said lumps.

FRANK J. GELINAS.